United States Patent
Levin et al.

(10) Patent No.: US 6,654,546 B1
(45) Date of Patent: Nov. 25, 2003

(54) FIELD UPGRADEABLE RECORDING DEVICE

(75) Inventors: Dan Levin, Portola Valley, CA (US); Tom Carhart, Menlo Park, CA (US); Matthew Self, Redwood City, CA (US)

(73) Assignee: Digital Networks North America, Inc, Santa Clara ( * ) Notice: Subject to any disclaimer, the term of this patent is extended or adjusted under 35 U.S.C. 154(b) by 0 days.

(21) Appl. No.: 09/412,994

(22) Filed: Oct. 5, 1999

(51) Int. Cl.⁷ .......................... H04N 5/85; H04N 5/781
(52) U.S. Cl. ...................... 386/125; 386/126
(58) Field of Search .................. 360/125, 126, 360/124, 105, 106, 95, 52, 45, 46, 1, 40, 4; 369/13.56, 30.01, 30.03; H04N 5/85, 5/781

(56) References Cited

U.S. PATENT DOCUMENTS

| | | | |
|---|---|---|---|
| 4,204,235 A | * | 5/1980 | Stollorz |
| 4,682,248 A | | 7/1987 | Schwartz |
| 4,972,396 A | | 11/1990 | Rafner |
| 6,289,396 B1 | * | 9/2001 | Keller et al. |

FOREIGN PATENT DOCUMENTS

| | | |
|---|---|---|
| WO | WO 99/52279 A1 | 10/1999 |
| WO | WO 00/07368 A1 | 2/2000 |
| WO | WO 00/18108 A2 | 3/2000 |
| WO | WO 00/28736 A1 | 5/2000 |
| WO | WO 00/58833 A1 | 10/2000 |
| WO | WO 00/58834 A1 | 10/2000 |
| WO | WO 00/58967 A1 | 10/2000 |
| WO | WO 00/62298 A1 | 10/2000 |
| WO | WO 00/62299 A1 | 10/2000 |
| WO | WO 00/62533 A1 | 10/2000 |
| WO | WO 00/559214 A1 | 10/2000 |
| WO | WO 00/67475 A1 | 11/2000 |
| WO | WO 01/06370 A1 | 1/2001 |
| WO | WO 01/22729 A1 | 3/2001 |
| WO | WO 01/46843 A2 | 6/2001 |
| WO | WO 01/47238 A2 | 6/2001 |
| WO | WO 01/47249 A2 | 6/2001 |
| WO | WO 01/47279 A2 | 6/2001 |
| WO | WO 01/65762 A2 | 9/2001 |
| WO | WO 01/65862 A2 | 9/2001 |
| WO | WO 01/89203 A2 | 11/2001 |

OTHER PUBLICATIONS

Yuen et al., Enhancing Operations of Video Tape Cassette Players, Patent application publication No. US 2002/0012525 A1, Jan. 31, 2002.

* cited by examiner

*Primary Examiner*—Robert Chevalier
(74) *Attorney, Agent, or Firm*—McDonnell Boehnen Hulbert & Berghoff

(57) ABSTRACT

A method and apparatus providing for field upgrade of storage capacity in a recording device. The recording device is manufactured with a storage unit having a storage capacity of X (where X may be, for example, 5 GB). Access to the full storage capacity of the storage unit is limited at the time of manufacture and a user of the device may upgrade the device to gain access to additional storage capacity of the storage unit.

29 Claims, 3 Drawing Sheets

FIELD UPGRADEABLE RECORDING DEVICE

CROSS-REFERENCE TO RELATED APPLICATIONS

The following U.S. Patent Applications are incorporated herein by reference:

Ser. No. 09/131,091 titled "Video Data Recorder with Personal Channels" filed Aug. 7, 1998

Ser. No. 09/130,994 titled "Video Data Recorder with Integrated Channel Guides" filed Aug. 7, 1998;

Ser. No. 09/131,092 titled "Video Data Recorder for Recording Predefined Format Shows; and Ser. No. 09/132,690 titled "Digital Recording and Playback" filed Aug. 11, 1998.

These applications disclose a digital recording and playback device as may implement the present invention.

BACKGROUND OF THE INVENTION

It is well-known than that consumers will pay more money for computers and other electronic devices which record information if such devices have increased storage capacity. Quite simply, all other things being equal, a consumer will pay more for an electronic device that has a 5 GB hard disk drive than for an equivalent electronic device which has a 2 GB hard disk drive.

Unfortunately, if the user initially chooses to purchase the 2 GB hard disk drive electronic device and later decides that additional storage capacity is required, the user is typically required to either: (1) wholly replace the electronic device; (2) wholly replace the original disk drive with a disk drive having larger capacity; or (3) add an additional disk drive if the electronic device supports more than one disk drive.

Obviously, both options 1 and 2 above lead to significant additional expense for the user. Even option 3 leads to additional expense but also, like option 2, necessitates physically changing the configuration of the electronic device. Of course, physically changing the configuration may require special skills and for many consumers, therefore, requires taking the electronic device to a technician for the upgrade.

It would be useful if an improved method and apparatus existed for allowing a field upgrades of the storage capacity of electronic devices which record information. Such devices are referred to collectively herein as recording devices. For purposes of the present application, the term recording device includes computers and other electronic devices such as, by way of example, video data recorders such as the ReplayTV video data recorder that is available from Replay Networks, Inc. of Mountain View Calif.

SUMMARY OF THE INVENTION

A method and apparatus providing for field upgrade of storage capacity in a recording device is disclosed. The recording device is manufactured with a storage unit having a storage capacity of X (where X may be, for example, 5 GB). Access to the full storage capacity of the storage unit is limited at the time of manufacture and a user of the device may upgrade the device to gain access to additional storage capacity of the storage unit.

Figure 1:
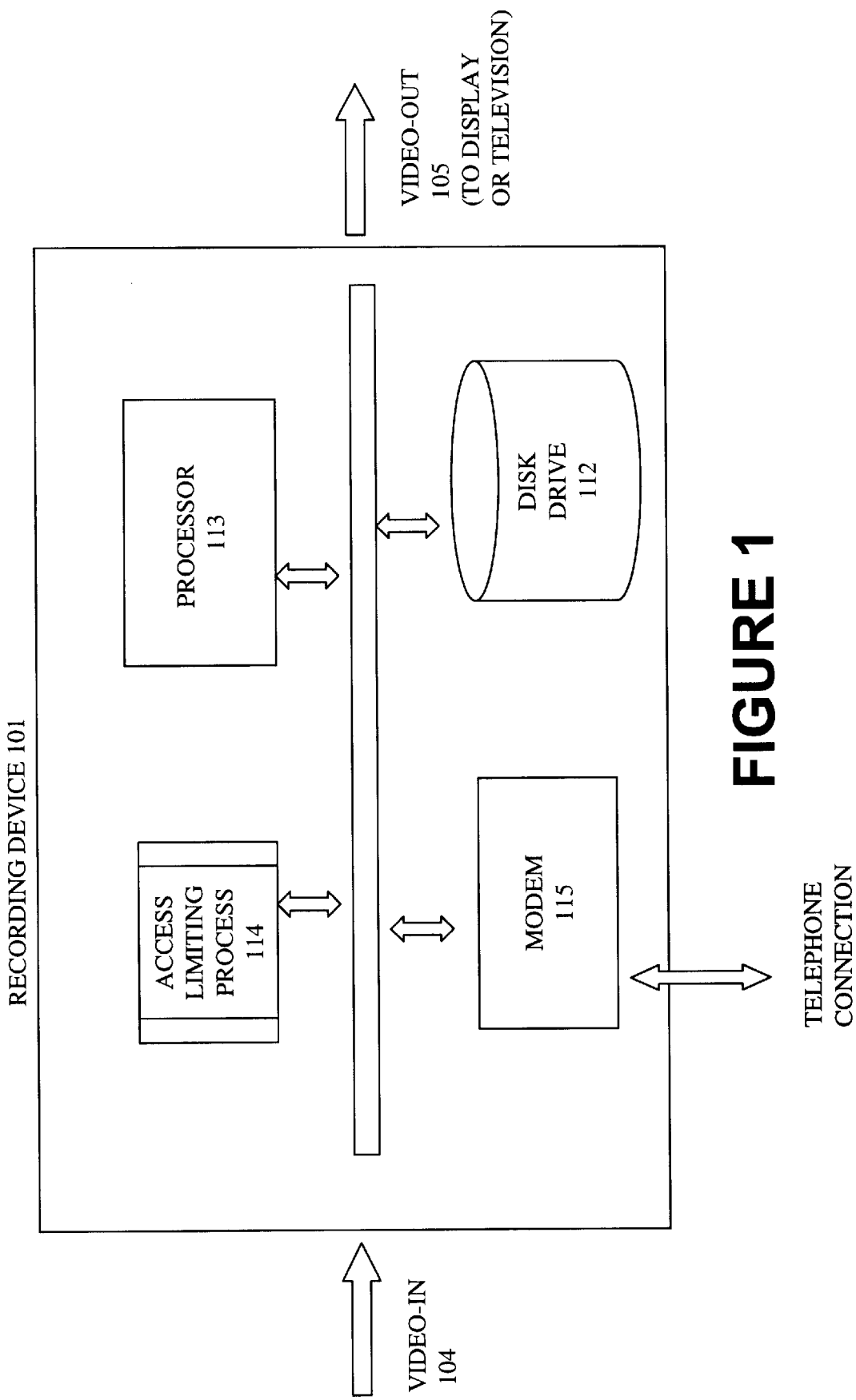
FIG. 1 is an overall diagram of a recording device as may implement the present invention.
Figure 3:
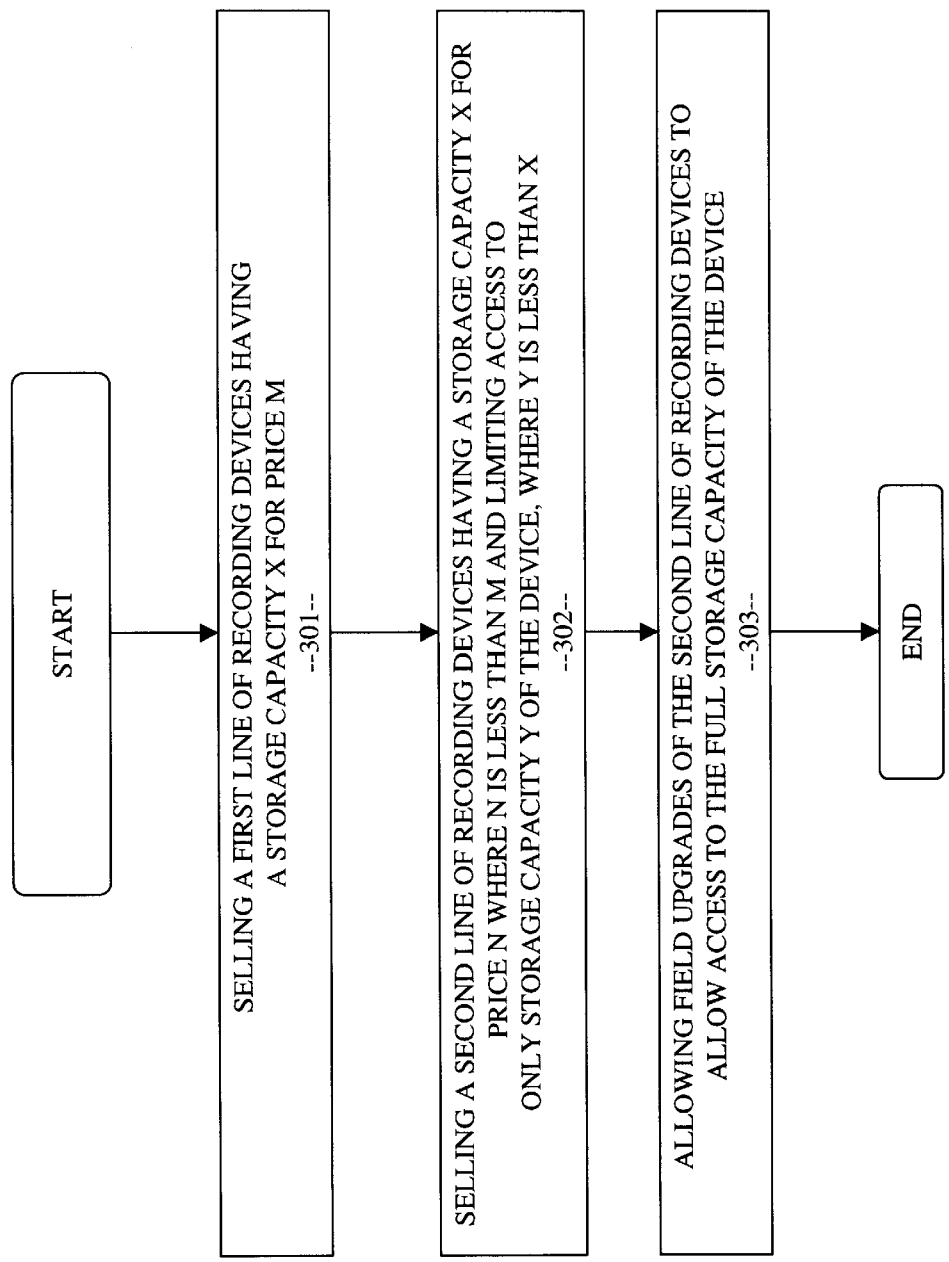
FIG. 3 is an overall flow diagram illustrating a method of selling recording devices as may implement the present invention.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF THE EMBODIMENTS THE PRESENT INVENTION

FIG. 1 is a simplified block diagram illustrating the digital recording and playback device 101 and illustrating the device 101 including an access limiting process 114 which may be stored on a suitable storage media within the recording device 101 for execution by processor 113.

As is illustrated by FIG. 1, the recording device 101 in the described embodiment includes video input 104 and a video output 105. Of course, the present invention may find application in devices for recording other types of information (e.g., data and audio).

Video information that is received on video input 104 is stored on disk drive 112. In other embodiments of the invention, other means for receiving information to be recorded on a storage media may be utilized. For example, in a computer system implementing the present invention, the information may be received from any number of information inputs including, for example, a CD ROM drive, a DVD ROM drive, a diskette drive, a network connection, a telephonic connection such as a modem or various other inputs. In addition, FIG. 1 illustrates use of a disk drive 112 as a storage device. However, in other embodiments of the invention other mass storage devices may be utilized without departure from the spirit and scope of the present invention.

In the described embodiment of the invention, multiple product lines are made available. For example, a first video recorder product may be sold at a price of approximately $700 and allow for 10 hours of video storage. A second video recorder product may be sold at a price of approximately $900 and allow for 14 hours of video storage. A third video recorder product may be sold at a price of approximately $1500 and allow for 28 hours of video storage.

Clearly, in prior art implementations, multiple product lines as described above may be made available by providing disk drives of various capacities in each of the various product lines. As one feature of the present invention, the various products may be manufactured with disk drives of the same capacity. Access limiting process 114 is installed at the time of manufacture of recording device 101 and is programmed to limit access to the storage capacity of disk drive 112 to either allow 10 hours, 14 hours or the full 28 hours of recording capacity. Access limiting process 114 is preferably a programmable or parameterizable process (e.g., software or firmware) which limits access to the disk drive 112.

In alternative embodiments, the access limiting process 114 may be implemented directly in the disk drive circuitry 112.

In one embodiment of the invention, a connection is provided to a service that allows for upgrade of the recording device. For example, the user may have originally purchased the recording device 101 with 10 hours of video storage capability because of the attractive price. However, after some use, the user may wish to upgrade to allow for 14 hours of video storage. The user may cause the device 101 to communicate with a service provided by the manufacturer of the device 101 over a communication connection. In the described embodiment, the communication connection utilizes a telephonic connection and modem 115. Of course, in alternative embodiments, other means of communication with the service may be utilized. For example, in certain embodiments the communication with the service may be over a network and in other embodiments the communication with the service may be through use of a diskette or other media which may be used to upgrade the access limiting process 114.

The service may charge for the upgrade. For example, if the user wishes to upgrade from the entry-level device allowing for 10 hours of video recording to the device allowing for 14 hours of video recording, the user may be charged $250. Clearly, in this case, the user would have paid less to have purchased the 14 hour device originally but would not have enjoyed the relatively low entry price of the 10 hour device. Of course, in other embodiments, other pricing models may be developed.

Figure 2:
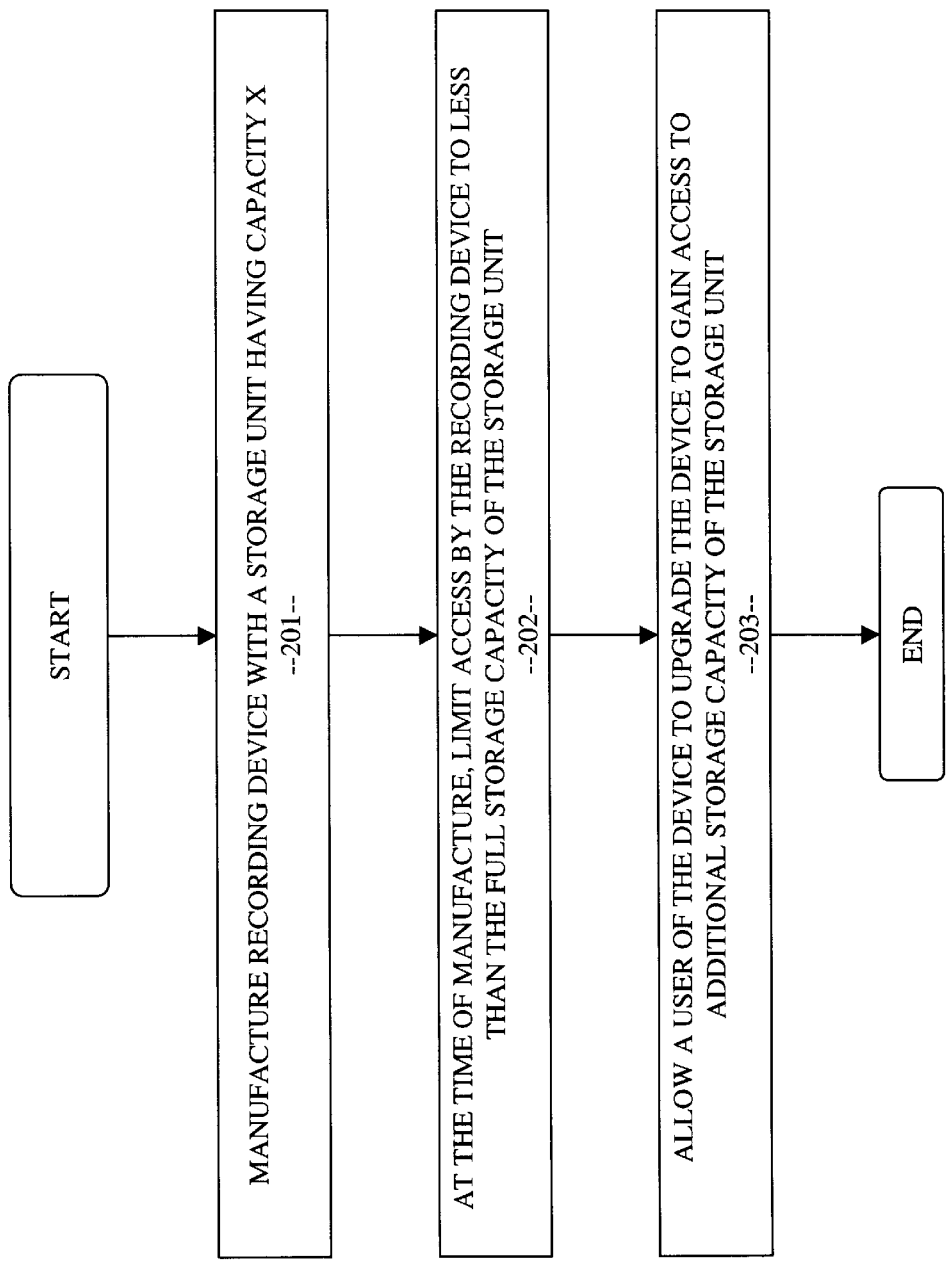
FIG. 2 is an overall flow diagram illustrating a method of manufacturing and using a device as may implement the present invention.

Turning out to FIG. 2, an overall flow diagram illustrating a method of manufacturing and using a recording device is shown. As has been discussed, the recording device may be manufactured with a storage unit having a capacity X (where X may be any convenient unit of measure, for example, hours of recording capacity or gigabytes of storage), block 201. At the time of manufacture, the recording device is manufactured to limit access to less than the full storage capacity of the storage unit, block 202. This may be accomplished for example using access limiting process 114. As has been described, the user of the device may then upgrade the device to gain access to additional storage capacity of the storage unit, block 203.

Turning to FIG. 3, a method of selling recording devices is illustrated in flow diagram form. While this method has been discussed briefly above in connection with FIG. 1, it is worthwhile to briefly review FIG. 3. As is illustrated by FIG. 3, the manufacturer of the recording devices may sell a first line of recording devices having a storage capacity of X (e.g. 28 hours of recording capacity), block 301. The manufacturer may also sell a second line of recording devices having a storage capacity of X but may limit access to only storage capacity Y (e.g., 10 or 14 hours). The manufacturer may then price the second line of recording devices at a price less than the price of the first line of recording devices, block 302. The manufacturer may offer (or authorize to be offered) a service which allows for field upgrades of the second line of recording devices to allow access to an increased amount of storage capacity or even the full storage capacity of the device, block 303.

The above description has discussed storage capacity in terms of number of hours of storage. In alternative embodiments, the storage capacity may be expressed in terms of total number of bytes (e.g. 10 gigabytes originally sold with upgrades in 5 gigabyte units). In addition, in certain embodiments, there may be various types or quality of information which might be stored (e.g., high quality video, medium quality video, low quality video, high quality audio, medium quality audio, low quality audio, etc.) In this type of an embodiment, the user may initially purchase a unit with, for example, 10 hours of medium quality video. Later, the user may wish to add some high quality video capacity and some medium quality audio capacity. Thus, using the techniques described above, the user may upgrade by "purchasing", for example, 5 hours of high quality video and 10 hours of medium quality audio capacity. In such an embodiment, the access limiting process 114 limits storage capacity in each of these categories of types of information rather than limiting access to a given amount of storage space.

Thus, when the present application refers to "storage capacity" it is referring to either the number of bytes of capacity, the number of hours of total capacity, or the number of hours, bytes or other unit of measurement available for a given type of information.

Thus, a method and apparatus for allowing field upgrades of recording devices has been described.

What is claimed is:

1. A method of providing for field upgrade of storage capacity in a recording device comprising:
   a) manufacturing the recording device with a storage unit having a capacity X;
   b) limiting access by the recording device to less than the full storage capacity of the storage unit at the time of manufacture; and
   c) allowing a user of the device to upgrade the device to gain access to additional storage capacity of the storage unit.

2. The method as recited in claim 1 wherein the storage unit is a disk drive.

3. The method as recited in claim 1 wherein the user is required to pay an additional charge in order to gain access to additional storage capacity of the storage unit.

4. The method as recited by claim 1 wherein the recording device records video signals.

5. The method as recited by claim 1 wherein the user upgrades the device over a communication connection with a service.

6. The method as recited by claim 1 wherein the user upgrades the device over a telephonic communication connection with a service.

7. The method as recited by claim 6 wherein the telephonic communication connection is provided over a modem.

8. A method of selling a recording devices comprising:
   a) selling a first line of recording devices having a storage capacity of X for price M;
   b) selling a second line of recording devices having a storage capacity of X for price N, N is less than M, the second line of recording devices limiting access to less than the full storage capacity of the device.

9. The method as recited by claim 8 wherein the second line of recording devices allow for field upgrade of their storage capacity.

10. The method as recited by claim 9 wherein a charge is made for field upgrades of the second line of recording devices.

11. The method as recited by claim 10 wherein the charge for upgrade of the second line of recording devices is greater than M minus N.

12. The method as recited by claim 9 wherein the recording device records video signals.

13. The method as recited by claim 9 wherein the field upgrades are accomplished using a communication connection with a service.

14. The method as recited by claim 9 wherein the field upgrades are accomplished using a telephonic communication connection with a service.

15. The method as recited by claim 9 wherein the telephonic communication connection is provided over a modem.

16. A recording device comprising:
   a) means for receiving information to be recorded;
   b) storage means for storing the information, the storage means having a capacity X;
   c) control means for controlling access to the storage means so that less than the full capacity of the storage means may be accessed by the recording device.

17. The recording device as recited by claim 16 wherein the storage means is a disk drive.

18. The recording device as recited by claim 16 wherein the means for receiving information is a video input.

19. The recording device as recited by claim 16 wherein control means comprises a program which when executed on a processor controls access to the storage means.

20. The recording device as recited by claim 16 further comprising a communication connection to a service which can modify the control means to allow access to additional storage capacity of the storage means.

21. The recording device as recited by claim 16 wherein the communication connection is a telephonic connection.

22. The recording device as recited by claim 16 wherein the communication connection is a telephonic connection over a modem.

23. A recording device comprising:
   a) a disk drive having capacity X;
   b) a processor;
   c) a stored program which when executed by the processor controls access to the disk drive such that the processor may access either the full capacity X of the disk drive if the stored program is operating in a first mode or less than the full capacity X of the disk drive if the stored program is operating in a second mode.

24. The recording device as recited by claim 23 wherein the stored program may be altered to operate in the first mode if it was originally programmed to operate in the second mode.

25. The recording device as recited by claim 23 wherein the program may be altered by a service over a communication connection with the recording device.

26. The recording device as recited by claim 23 wherein the program may be altered by a service over a telephonic communication connection with the recording device.

27. The recording device as recited by claim 23 wherein the recording device further comprises a telephonic connection.

28. The recording device as recited by claim 23 wherein the recording device further comprises a modem.

29. The recording device as recited by claim 23 wherein the recording device records video signals on the disk.

\* \* \* \* \*